US010850685B2

United States Patent
Bessho

(10) Patent No.: US 10,850,685 B2
(45) Date of Patent: Dec. 1, 2020

(54) ONBOARD RELAY DEVICE, INFORMATION PROCESSING METHOD, STORAGE MEDIUM STORING PROGRAM, RELAY DEVICE, AND INFORMATION PROCESSING SYSTEM

(71) Applicant: TOYOTA JIDOSHA KABUSHIKI KAISHA, Toyota-shi, Aichi-ken (JP)

(72) Inventor: Katsuhiko Bessho, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 82 days.

(21) Appl. No.: 16/123,649

(22) Filed: Sep. 6, 2018

(65) Prior Publication Data
US 2019/0118736 A1    Apr. 25, 2019

(30) Foreign Application Priority Data

Oct. 25, 2017    (JP) ................. 2017-206302

(51) Int. Cl.
*H04L 12/28* (2006.01)
*B60R 16/023* (2006.01)
*H04L 12/40* (2006.01)
*H04L 12/54* (2013.01)
*H04L 12/70* (2013.01)

(52) U.S. Cl.
CPC ...... *B60R 16/023* (2013.01); *H04L 12/40039* (2013.01); *H04L 12/5601* (2013.01); *H04L 2012/5618* (2013.01)

(58) Field of Classification Search
CPC ............. H04L 16/023; H04L 12/40039; H04L 12/5601; H04L 2012/5618
See application file for complete search history.

(56) References Cited

U.S. PATENT DOCUMENTS 9,400,543 B2 *   7/2016  Itou ................ G06F 1/3209
2008/0304499 A1 * 12/2008  Jeon ................ H04L 12/66
                                             370/401

(Continued)

FOREIGN PATENT DOCUMENTS

EP       1158718 A2 * 11/2001  ......... H04L 12/4641
JP    2009296280 A      12/2009
WO   2017167907 A1      10/2017

OTHER PUBLICATIONS

Jin et al. (Gateway Framework for In-Vehicle Networks Based on CAN, FlexRay, and Ethernet, IEEE Transactions on Vehicular Technology, vol. 64, No. 10, Oct. 2014).*

*Primary Examiner* — Maharishi V Khirodhar
(74) *Attorney, Agent, or Firm* — Hunton Andrews Kurth LLP

(57) ABSTRACT

An onboard relay device relays data which is transmitted and received between a first onboard device connected to a first network and a second onboard device connected to a second network, and includes: a determination unit configured to determine whether the first network is a target for cooperation control in which a network state is changed along with the second network; and a control unit configured to transmit a request associated with a change of the network state to the second network when first data has been received from the first onboard device in a case where the first network is the target for the cooperation control.

9 Claims, 7 Drawing Sheets

(56) References Cited

U.S. PATENT DOCUMENTS

| | | | |
|---|---|---|---|
| 2013/0201817 A1* | 8/2013 | Jiang | H04L 41/0659 370/217 |
| 2014/0229753 A1* | 8/2014 | Itou | G06F 1/3209 713/323 |
| 2019/0103988 A1* | 4/2019 | Martin | H04L 12/40013 |

* cited by examiner

| NETWORK ID | CONTROL TARGET | DEVICE ID | WHETHER SLEEPING IS ENABLED OR DISABLED | WHETHER OR NOT NM FUNCTION IS PROVIDED |
|---|---|---|---|---|
| 201 | TARGET | 10-1A | ENABLED | YES |
|  |  | ... | ... | ... |
| ... | ... | ... | ... | ... |
| 204 | NOT TARGET | 10-4A | - | NO |
|  |  | ... | ... | ... |
| ... | ... | ... | ... | ... |

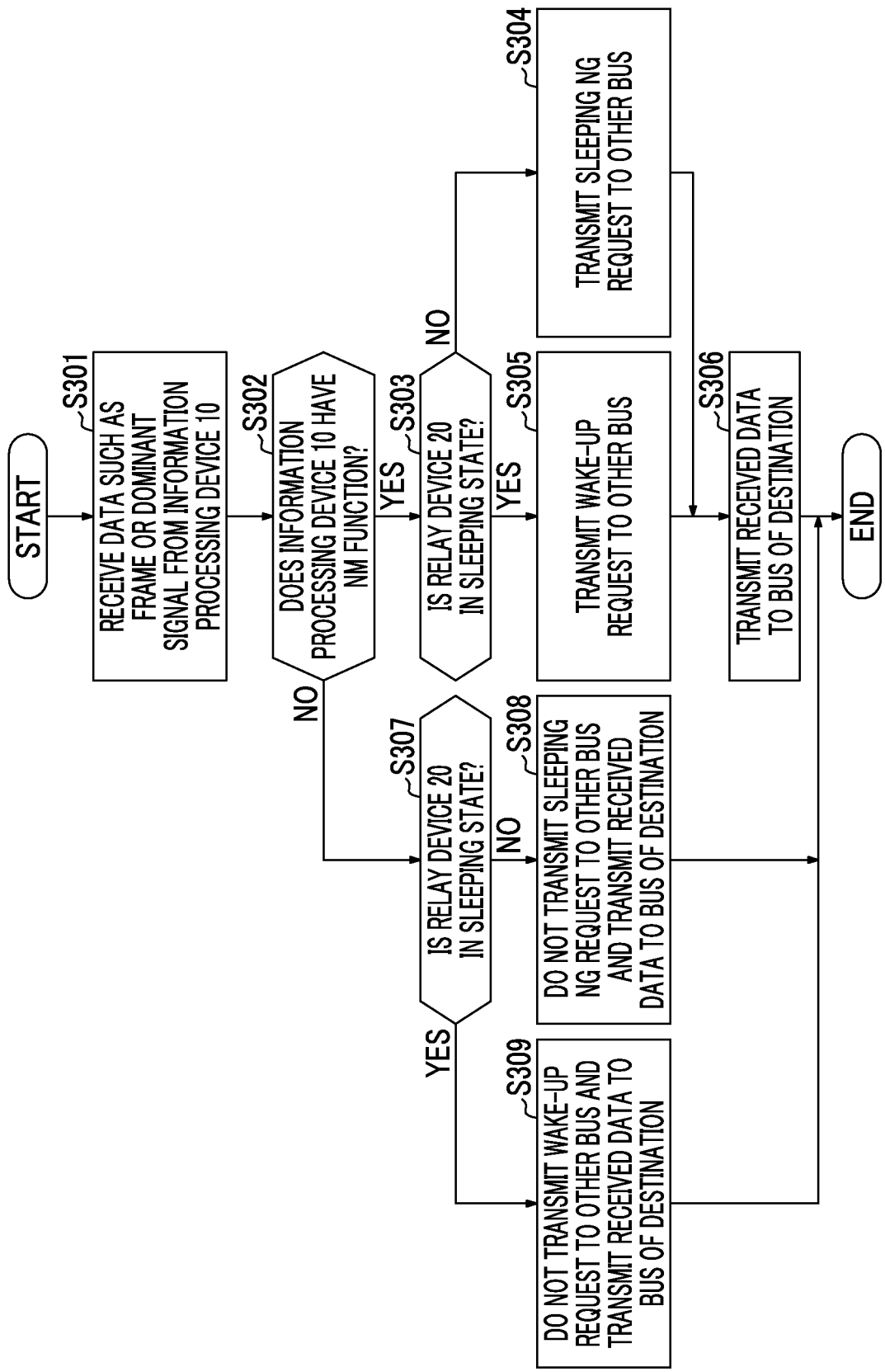

ONBOARD RELAY DEVICE, INFORMATION PROCESSING METHOD, STORAGE MEDIUM STORING PROGRAM, RELAY DEVICE, AND INFORMATION PROCESSING SYSTEM

INCORPORATION BY REFERENCE

The disclosure of Japanese Patent Application No. 2017-206302 filed on Oct. 25, 2017 including the specification, drawings and abstract is incorporated herein by reference in its entirety.

BACKGROUND

1. Technical Field

The disclosure relates to an onboard relay device, an information processing method, a storage medium storing a program, a relay device, and an information processing system.

2. Description of Related Art

In a network system such as an onboard network system, a related technique in which a gateway device that relays data which is transmitted and received between a plurality of networks can cause electronic control units (ECUs) connected to the networks to sleeping when the ECUs are in a sleeping-enabled state is known (for example, see Japanese Unexamined Patent Application Publication No. 2009-296280 (JP 2009-296280 A)).

OSEK/VDX (Offene Systeme and deren schnittstellen fur die Elektronik im Kraftfahrzeug/Vehicle Distributed eXecutive) is known as a specification for controlling an onboard ECU. In this specification, ECUs provided in one network determine whether sleeping of their own ECUs is enabled or disabled and transmit a network management (NM) frame indicating whether sleeping is enabled or disabled to a network bus. In order to achieve cooperation of the whole network system, a gateway device that relays data between a plurality of networks determines whether sleeping of its own device is enabled or disabled including whether sleeping of networks connected thereto is enabled or disabled and transmits an NM frame indicating whether its sleeping is enabled or disabled or the like to the network bus. Transmission of an NM frame from the ECUs of the networks and the gateway device is performed in a prescribed order of networks.

When all the ECUs in the networks and the gateway device are in a sleeping-enabled state, the ECU or the gateway device which should transmit an NM frame next time in the prescribed order of networks transmits the NM frame of a sleeping request such that the corresponding ECU or the gateway device in the networks is sleeping at the time of transmission from the corresponding ECU or the gateway device. The ECUs in the networks or the gateway device receives a sleeping request from other ECUs or the gateway device and changes to a sleeping state.

An onboard ECU wakes up with generation of a dominant waveform (also referred to as a dominant signal) in control area network (CAN) communication in a network or transmission of a frame as a trigger in a sleeping state depending on the specification, and returns from the sleeping state to the normal state. When a predetermined signal such as a frame or a dominant waveform has been received from the ECUs, the gateway device transmits an NM frame of a wake-up request to the networks by broadcasting or the like.

SUMMARY

When control of simultaneously changing the ECUs to a normal state or a sleeping state is performed, an ECU not having an NM function may be connected to the gateway device. In this case, in the related art, since the whole system cannot change to the sleeping state or the whole system may change from the sleeping state to the normal state due to a signal or a frame from the corresponding ECU, there is a problem in that electric power in a battery of a vehicle is consumed.

The disclosure provides a technique capable of reducing power consumption.

A first aspect of the disclosure provides an onboard relay device that is configured to relay data which is transmitted and received between a first onboard device connected to a first network and a second onboard device connected to a second network. The onboard relay device includes: a determination unit configured to determine, based on data transmitted from the first onboard device, whether the first network is a target for cooperation control in which a network state is changed along with the second network; and a control unit configured to transmit a request associated with a change of the network state to the second network when first data has been received from the first onboard device in a case where the first network is the target for the cooperation control, and not to transmit the request associated with the change of the network state to the second network when the first data has been received in a case where the first network is not the target for the cooperation control.

According to the first aspect, a request associated with change of the network state is prevented from being transmitted to an onboard device connected to the network which is a target for control based on communication in a network which is not a target for control of simultaneously changing the network state. Accordingly, it is possible to reduce power consumption.

In the first aspect, the network state may include a sleeping state and a normal state.

According to this configuration, a request for changing the network state to the sleeping state or the normal state is prevented from being transmitted to an onboard device connected to the network which is a target for control based on communication in a network which is not a target for control of simultaneously changing the network state to the sleeping state or the normal state. Accordingly, it is possible to reduce power consumption.

In the first aspect, the control unit may be configured, when the onboard relay device is in a sleeping state and the control unit has received the first data, to relay the first data to the second network in the case where the first network is the target for the cooperation control and not to relay the first data to the second network in the case where the first network is not the target for the cooperation control.

According to this configuration, when the whole system is in the sleeping state, an onboard device connected to the network which is a target for control is prevented from changing to the normal state based on communication in a network which is not a target for control. Accordingly, it is possible to further reduce power consumption.

In the first aspect, the request associated with the change of the network state may be a request for prohibiting the second onboard device from changing to a sleeping state when the onboard relay device is in a normal state, and the request associated with the change of the network state may be a request for changing the second onboard device to the normal state when the onboard relay device is in the sleeping state.

According to this configuration, when the whole system is in the sleeping state, an onboard device connected to the network which is a target for control is prevented from changing to the normal state based on communication in a network which is not a target for control. When the whole system is in the normal state, an onboard device connected to the network which is a target for control is prevented from changing to the sleeping state based on communication in a network which is not a target for control. Accordingly, it is possible to further reduce power consumption.

In the first aspect, the determination unit may be configured to determine that the first network is the target for the cooperation control when the data transmitted from the first onboard device includes data indicating that the first network is enabled to change to a sleeping state.

According to this configuration, a network to which an onboard device having a function of performing the control is connected is determined to be a target for control. Accordingly, it is possible to appropriately determine that a network is a target for control.

In the first aspect, the data indicating that the first network is enabled to change to the sleeping state may be transmitted using a network management frame which is defined by Offene Systeme and deren schnittstellen fur die Elektronik im Kraftfahrzeug (OSEK), OSEK-Vehicle Distributede Xecutive (OSEK-VDX), or AUTomotive Open System Architecture (AUTOSAR).

According to this configuration, a network to which an onboard device having a function of performing the control is connected in an onboard system is determined to be a target for control. Accordingly, it is possible to appropriately determine that a network is a target for control.

A second aspect of the disclosure provides an information processing method executable by a relay device that relays data which is transmitted and received between a first device connected to a first network and a second device connected to a second network. The information processing method includes: determining, based on data transmitted from the first device, whether the first network is a target for cooperation control in which a network state is changed along with the second network; and transmitting a request associated with a change of the network state to the second network when first data has been received from the first device in a case where the first network is the target for the cooperation control, and not transmitting the request associated with the change of the network state to the second network when the first data has been received from the first device in a case where the first network is not the target for the cooperation control.

A third aspect of the disclosure provides a non-transitory storage medium storing a program. The program is executable by a relay device that relays data which is transmitted and received between a first device connected to a first network and a second device connected to a second network. The program is configured to cause the relay device to perform an information processing method when the program is executed by the relay device. The method includes: determining, based on data transmitted from the first device whether the first network is a target for cooperation control in which a network state is changed along with the second network; and transmitting a request associated with a change of the network state to the second network when first data has been received from the first device in a case where the first network is the target for the cooperation control, and not transmitting the request associated with the change of the network state to the second network when the first data has been received from the first device in a case where the first network is not the target for the cooperation control.

A fourth aspect of the disclosure provides a relay device that relays data which is transmitted and received between a first device connected to a first network and a second device connected to a second network. The relay device includes: a determination unit configured to determine, based on data transmitted from the first device, whether the first network is a target for cooperation control in which a network state is changed along with the second network; and a control unit configured to transmit a request associated with a change of the network state to the second network when first data has been received from the first device in a case where the first network is the target for the cooperation control, and not to transmit the request associated with the change of the network state to the second network when the first data has been received from the first device in a case where the first network is not the target for the cooperation control.

A fifth aspect of the disclosure provides an information processing system including: a first device connected to a first network; a second device connected to a second network; and a relay device that relays data which is transmitted and received between the first device and the second device. The relay device includes: a determination unit configured to determine, based on data transmitted from the first device, whether the first network is a target for cooperation control in which a network state is changed along with the second network, and a control unit configured to transmit a request associated with a change of the network state to the second network when first data has been received from the first device in a case where the first network is the target for the cooperation control, and not to transmit the request associated with the change of the network state to the second network when the first data has been received from the first device in a case where the first network is not the target for the cooperation control. The second device is configured to change to a normal state or not to change to a sleeping state when the second device has received a request for prohibiting change to the sleeping state from the relay device after having transmitted data indicating that the second device is enabled to change to the sleeping state.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 8 is a flowchart illustrating an example of an NM cooperation control routine which is performed by a relay device according to a second embodiment.

DETAILED DESCRIPTION OF EMBODIMENTS

Hereinafter, embodiments of the disclosure will be described with reference to the accompanying drawings.

First Embodiment

<System Configuration>

Figure 1A:
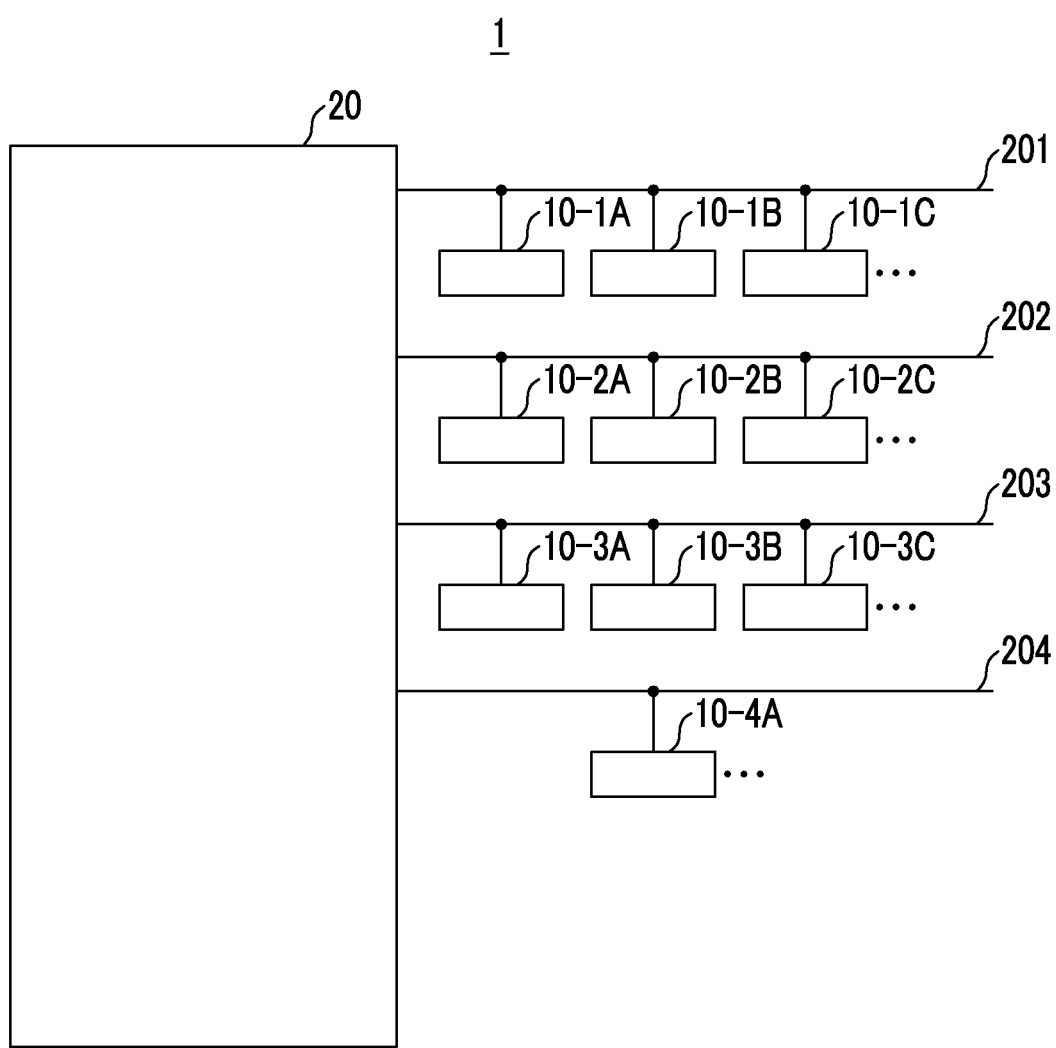
FIG. 1A is a diagram illustrating an example of a configuration of an information processing system according to an embodiment.

FIG. 1A is a diagram illustrating an example of a configuration of an information processing system 1 according to a first embodiment. In FIG. 1A, the information processing system 1 includes an information processing device 10-1A, an information processing device 10-1B, an information processing device 10-1C, . . . , an information processing device 10-2A, an information processing device 10-2B, an information processing device 10-2C, . . . , an information processing device 10-3A, an information processing device 10-3B, an information processing device 10-3C, . . . , an information processing device 10-4A, . . . (hereinafter simply referred to as "information processing devices 10" when these information processing devices do not need to be distinguished from each other), and a relay device 20. The number of information processing devices 10 is not limited to the example illustrated in FIG. 1A. The information processing system 1 may include a plurality of relay devices 20.

In the following description, an onboard system in which onboard devices (onboard ECUs) which are examples of the information processing device 10 are connected to each other by an onboard LAN using a CAN via an onboard relay device which is an example of the relay device 20 will be described as an example of the information processing system 1.

However, the disclosed technique can be applied to various devices, various relay devices, and the like of the information processing system 1 such as a device-controlling network system in a device such as a robot, a device-controlling network system in a factory or the like, or an Internet of things (IoT) system in which a sensor or the like is connected to a cloud or the like.

The information processing device 10-1A, the information processing device 10-1B, the information processing device 10-1C, and the like (which are examples of a "first onboard device" or a "second onboard device") are, for example, ECUs for realizing a driving support function, and are connected to a bus 201 (which is an example of a "first network" or a "second network") in the example illustrated in FIG. 1A.

The information processing device 10-2A, the information processing device 10-2B, the information processing device 10-2C, and the like (which are examples of a "first onboard device" or a "second onboard device") are, for example, ECUs for realizing a multimedia function, and are connected to a bus 202 (which is an example of a "first network" or a "second network") in the example illustrated in FIG. 1A.

The information processing device 10-3A, the information processing device 10-3B, the information processing device 10-3C, and the like (which are examples of a "first onboard device" or a "second onboard device") are, for example, ECUs for realizing a power train function of transmitting rotational energy generated from an engine to driving wheels or ECUs for realizing a chassis function of performing suspension, steering, or the like, and are connected to a bus 203 (which is an example of a "first network" or a "second network") in the example illustrated in FIG. 1A.

The information processing device 10-4A and the like (an example of a "first onboard device") is an ECU that is attached to a vehicle after the vehicle has been manufactured by a vehicle manufacturer, such as a device other than a genuine device manufactured by the vehicle manufacturer and attached to the vehicle by an automobile supplier or the like. The information processing device 10-4A and the like are, for example, ECUs of a car navigation and a remote starter and are connected to a bus 204 (which is an example of a "first network") in the example illustrated in FIG. 1A.

The information processing device 10-4A and the like are devices not having an NM function which will be described later, and generates a dominant waveform or transmits a frame at a predetermined time even when an accessory (ACC) power source and an ignition (IG) power source are turned off. Alternatively, it is assumed that the information processing device 10-4A and the like have an NM function which will be described later and includes a component not satisfying a predetermined quality reference which is defined by a vehicle maker, and there is a likelihood that dominant anchoring (disorder of anchoring a bus to a dominant belt) of continuously issuing a dominant signal will occur due to malfunction of short-circuit of a circuit or the like.

The relay device 20 is, for example, a gateway that is used in an onboard network to which an onboard device is connected in a communicative manner. The relay device 20 performs control such that starting states of the information processing devices 10 are equalized depending on specifications of a network management (NM) function of Offene Systeme und deren schnittstellen fur die Elektronik im Kraftfahrzeug (OSEK), OSEK-Vehicle Distributed eXecutive (VDX), or AUTomotive Open System Architecture (AUTOSAR) which is upper-compatible with the OSEK as an operating system (OS).

Here, the NM function is, for example, a function of transmitting and receiving IDs of devices in networks and NM frames including information indicating that the devices can change to a sleeping state between the devices and simultaneously changing all the devices to the sleeping state when all the devices having the NM function can sleeping.

Figure 1B:
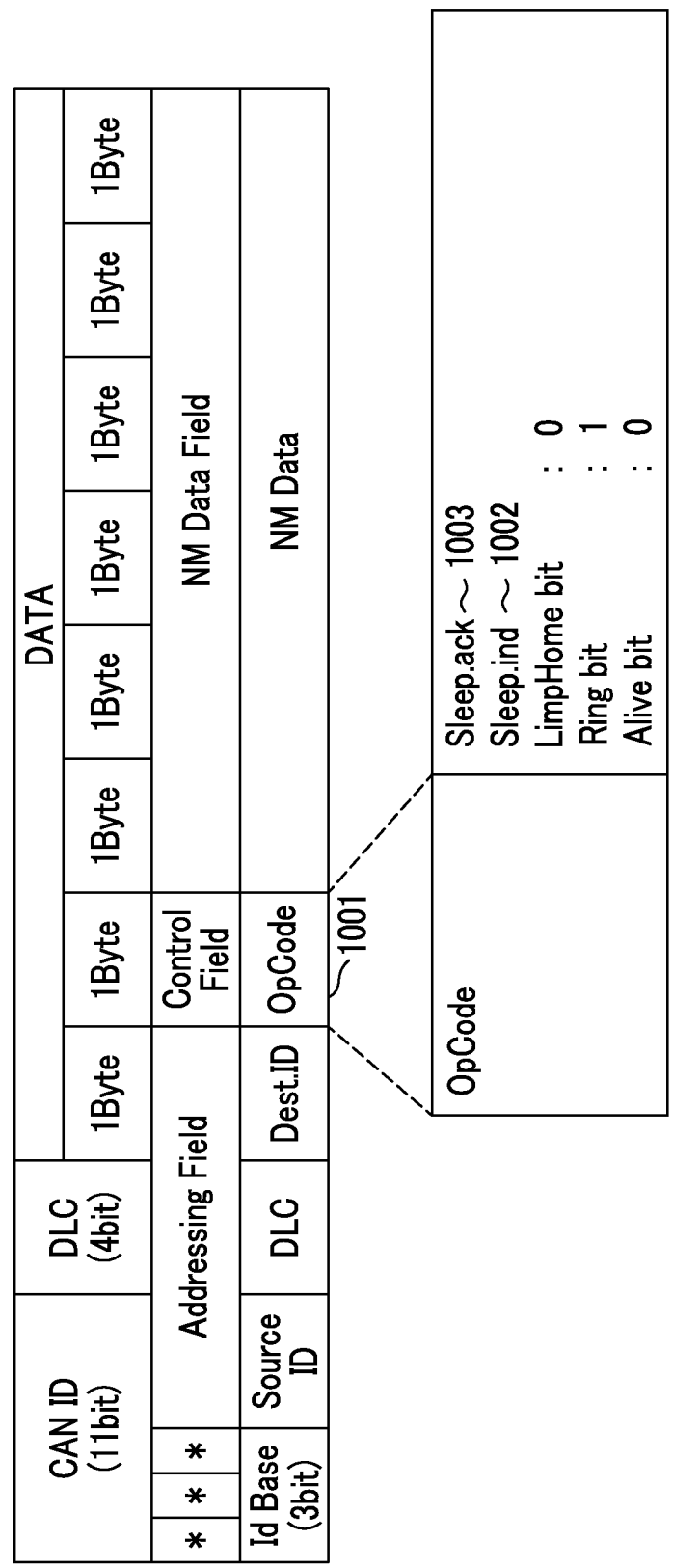
FIG. 1B is a diagram illustrating an example of an NM frame according to the embodiment.

FIG. 1B is a diagram illustrating an example of an NM frame according to this embodiment. As illustrated in FIG. 1B, an NM frame is a message based on a predetermined format, in which a type of a request is defined by values of a Sleeping.ind bit 1002 and a Sleeping.ack bit 1003 in an OpCode field 1001.

When it becomes a sleeping-enabled state, an information processing device 10 transmits an NM frame in which the value of the Sleeping.ind bit 1002 is set to "1" and the value of the Sleeping.ack bit 1003 is set to "0" and which indicates that it can change to the sleeping state (sleeping-enabled) to the bus.

When the value of the Sleeping.ind bit 1002 in an NM frame received from the relay device 20 or the like is "0" and the value of the Sleeping.ack bit 1003 is "0," the information processing device 10 does not change to the sleeping state but is maintained in a wake-up state for at least 5 seconds to 60 seconds. The NM frame is an NM frame indicating that sleeping is disabled and can be referred to as a "request for prohibiting change to the sleeping state" (an example of a "request associated with change of a network state").

When the value of the Sleeping.ind bit 1002 in an NM frame received from the relay device 20 or the like is "1" and the value of the Sleeping.ack bit 1003 is "1," the information processing device 10 changes to the normal state. The NM frame is an NM frame of a wake-up request and can be referred to as a "request for change to the normal state" (an example of a "request associated with change of a network state").

<Hardware Configuration>

Figure 2:
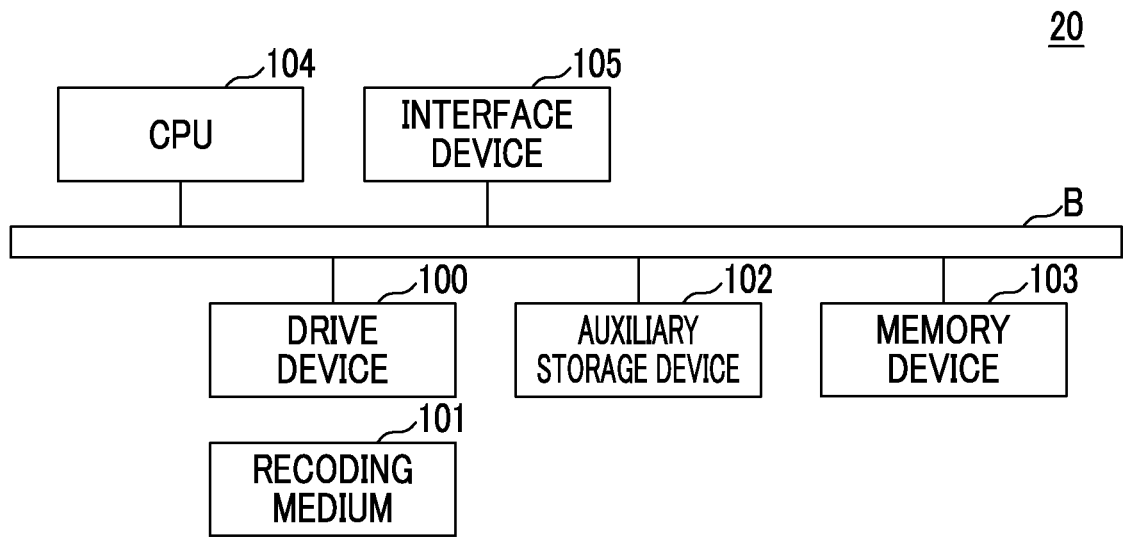
FIG. 2 is a diagram illustrating an example of hardware configurations of a relay device and an information processing device according to the embodiment.

FIG. 2 is a diagram illustrating an example of hardware configurations of an information processing device 10 and a relay device 20 according to the embodiment. In the following description, the relay device 20 will be described as an example. The relay device 20 illustrated in FIG. 2 includes a drive device 100, an auxiliary storage device 102, a memory device 103, a central processing unit (CPU) 104, and an interface device 105, all of which are connected to each other via a bus B.

An information processing program for realizing a processing routine in the relay device 20 is provided, for example, through a recording medium 101. When a recording medium 101 having the information processing program recorded thereon is set into the drive device 100, the information processing program is installed in the auxiliary storage device 102 from the recording medium 101 via the drive device 100. Here, installing of the information processing program does not have to be performed using the recording medium 101 and the information processing program may be downloaded from another computer via a network. The auxiliary storage device 102 stores necessary files, data, and the like along with the installed information processing program.

The memory device 103 is, for example, a random access memory (RAM), and reads and stores a program from the auxiliary storage device 102 when an instruction to start the program has been issued. The CPU 104 realizes functions associated with the relay device 20 in accordance with the program stored in the memory device 103. The interface device 105 is used as an interface for connection to a network. The interface device 105 is provided, for example, for each of a plurality of network ports disposed in the relay device 20.

Examples of the recording medium 101 include portable recording mediums such as a CD-ROM, a DVD disk, and a USB memory. Examples of the auxiliary storage device 102 include a hard disk drive (HDD) and a flash memory. Either of the recording medium 101 and the auxiliary storage device 102 corresponds to a computer-readable recording medium.

The hardware configuration of the information processing device 10 may be the same as that of the relay device 20. The information processing device 10 may have a configuration including only one interface device 105.

<Functional Configuration>

Figure 3:
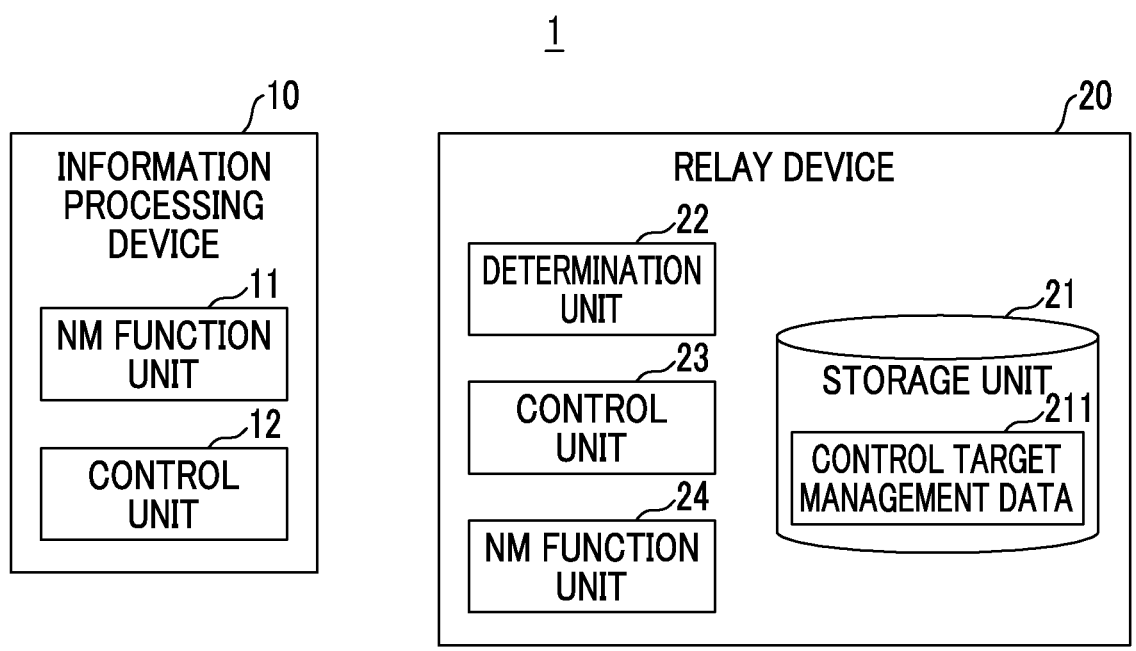
FIG. 3 is a diagram illustrating an example of functional blocks of the information processing device and the relay device according to the embodiment.

Functional configurations of the information processing device 10 and the relay device 20 according to the embodiment will be described below with reference to FIG. 3. FIG. 3 is a diagram illustrating an example of functional block diagrams of an information processing device 10 and a relay device 20.

<<Information Processing Device>>

The information processing device 10 includes an NM function unit 11 and a control unit 12. The NM function unit 11 and the control unit 12 are functions which are embodied by causing the CPU of the information processing device 10 to execute one or more programs installed in the information processing device 10.

The NM function unit 11 performs processes associated with an NM function depending on specifications of the above-mentioned NM functions. The control unit 12 performs control of various devices such as a sensor included in the information processing device 10 or communication with another information processing device 10.

<<Relay Device>>

The relay device 20 includes a storage unit 21. The storage unit 21 is embodied, for example, using the auxiliary storage device 102. The storage unit 21 stores a control target management data 211. Data stored in the control target management data 211 will be described later.

The relay device 20 further includes a determination unit 22, a control unit 23, and an NM function unit 24. The determination unit 22, the control unit 23, and the NM function unit 24 are functions which are embodied by causing the CPU 104 of the information processing device 10 to execute one or more program installed in the information processing device 10.

The determination unit 22 determines whether the information processing device 10 has an NM function based on an NM frame transmitted from the information processing device 10. The determination unit 22 determines that a bus (a network) to which one or more information processing devices 10 having an NM function are connected is a target for NM cooperation control (an example of "control of changing a network state") and determines that a bus to which an information processing device 10 having an NM function is not connected is not a target for NM cooperation control (not a target).

Here, NM cooperation control is control of changing devices connected to a plurality of networks (buses) subjected to relay of the relay device 20 to a sleeping (rest) state or a wake-up (started) state in cooperation (simultaneously). Specifically, the relay device 20 monitors NM frames in the plurality of networks and transmits a sleeping NG request (a "request for prohibiting change to the sleeping state", for example, an NM frame indicating that sleeping is disabled) to the plurality of networks by broadcasting or the like until the devices connected to the plurality of networks become sleeping-enabled. When the devices having an NM function become sleeping-enabled, the relay device 20 transmits a signal or a request for enabling sleeping to the plurality of networks and simultaneously changes the devices to the sleeping state. When the trigger has been detected in one network of the plurality of networks, the relay device 20 transmits a wake-up request (a "request for change to a normal state") to other networks of the plurality of networks.

The NM function unit 24 performs processes associated with the NM function in accordance with the specification of the NM function or an instruction from the control unit 23.

When data is received based on a signal or a frame from an information processing device 10 connected to a bus which is determined to be a target for NM cooperation control by the determination unit 22, the control unit 23 transmits a request for prohibiting change to a sleeping state based on an NM frame or a request for change to a normal state (under wake-up or a normally operating state) based on an NM frame to buses other than the corresponding bus. Here, a normal state is a normally started state. A sleeping state is a state in which power consumption is lower than that in the normal state by stopping at least a part of functions of an information processing device 10 in the normal state, or the like.

When data is transmitted based on a signal or a frame from an information processing device 10 connected to a bus which is not determined to be a target for NM cooperation control by the determination unit 22, the control unit 23 controls the NM function unit 24 such that an NM frame with transmission of the data as a trigger is not transmitted to buses other than the corresponding bus.

<Processing Routine>

Figure 4:
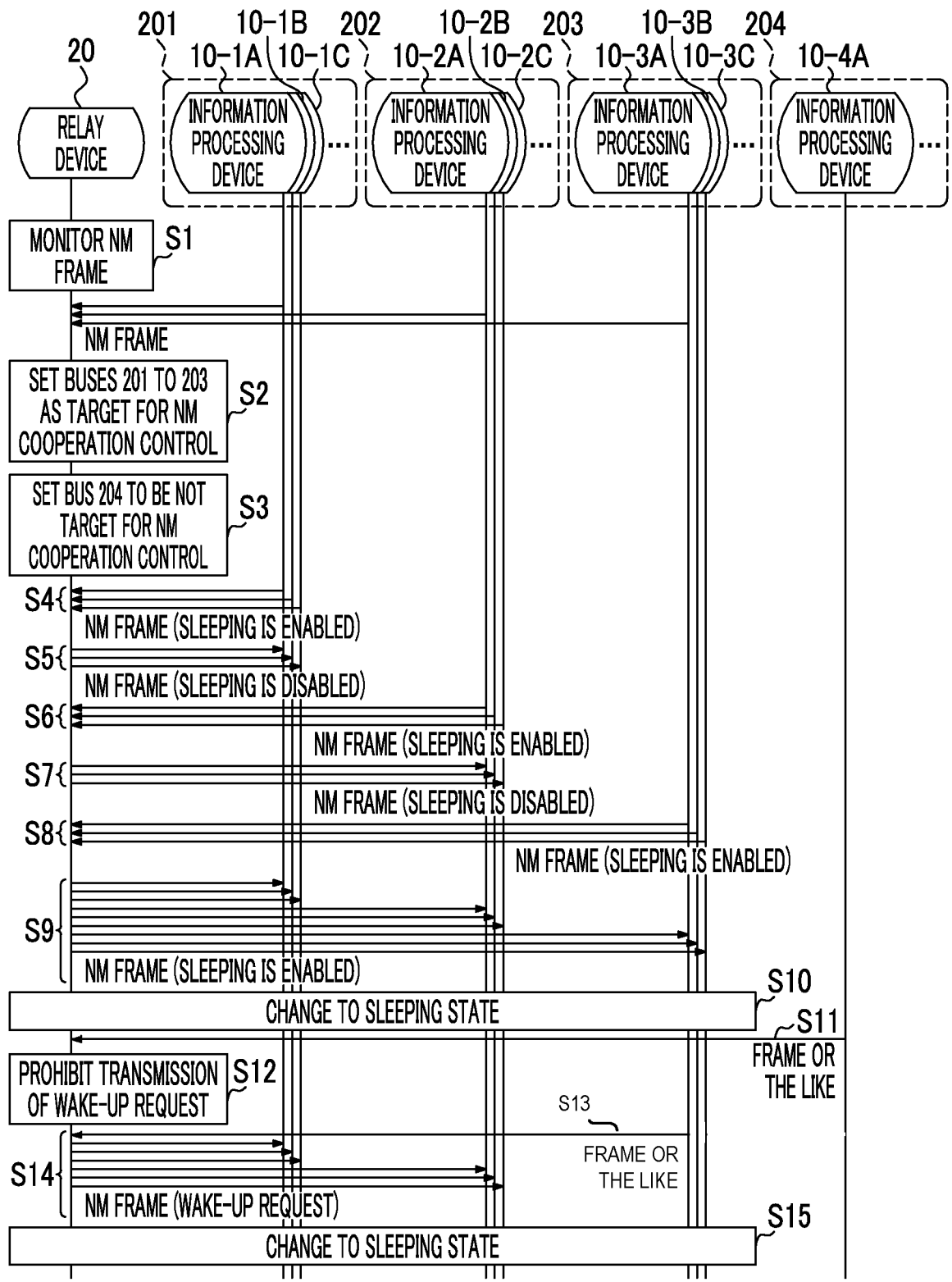
FIG. 4 is a sequence diagram illustrating an example of a routine which is performed by the information processing system according to the embodiment.
Figures 5, 6:
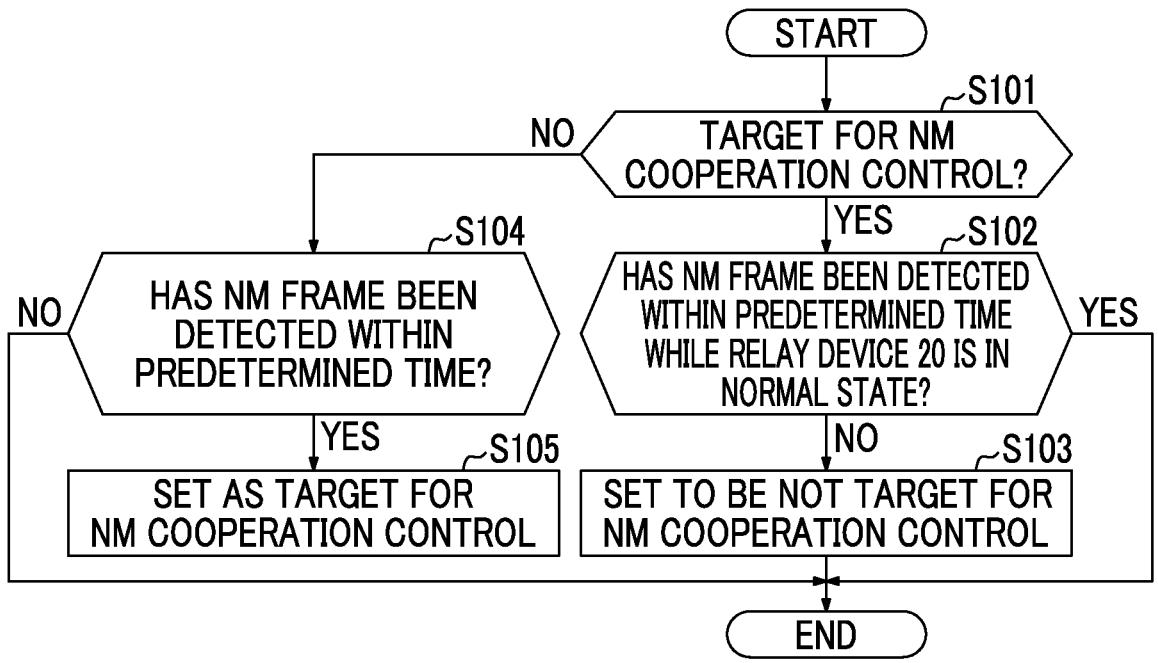
FIG. 5 is a diagram illustrating an example of control target management data according to the embodiment.
FIG. 6 is a flowchart illustrating an example of a routine of setting an NM cooperation control target of the relay device according to the embodiment.

A processing routine which is performed by the information processing system 1 according to the embodiment will be described below with reference to FIGS. 4 and 5. FIG. 4 is a sequence diagram illustrating an example of a processing routine which is performed by the information processing system 1 according to the embodiment. FIG. 5 is a diagram illustrating an example of a control target management data 211 according to a first embodiment. In the following example, it is assumed that the information processing devices 10-1A to 10-3C and the like have an NM function and the information processing device 10-4A does not have an NM function.

In Steps S1, the determination unit 22 of the relay device 20 monitors NM frames in the buses 201 to 204.

Subsequently, when transmission of NM frames in the buses 201 to 203 has been detected within a predetermined time, the determination unit 22 of the relay device 20 sets the buses 201 to 203 as a target for NM cooperation control in the control target management data 211 (Step S2).

In the control target management data 211 illustrated in FIG. 5, an item of a control target is stored in correlation with a network ID, and sleeping enabled/disabled and whether or not an NM function is provided are stored in correlation with the network ID and a device ID. The network ID is identification information of a bus connected to the relay device 20. The network ID may be, for example, an ID of a communication module of the relay device 20 connected to each bus. The control target is information indicating whether it is a target for NM cooperation control. The device ID is identification information of an information processing device 10 connected to a bus correlated with the network ID. The device ID may be, for example, an ID which is preset for the information processing device 10. Sleeping enabled/disabled is information indicating whether sleeping in each information processing device 10 is enabled or disabled. Whether or not an NM function is provided is information indicating whether or not an NM function is provided in each information processing device 10. The relay device 20 determines that an information processing device 10 having notified that change to a sleeping state is possible using an NM frame has an NM function, and sets the item of whether or not an NM function is provided in the control target management data 211 to "YES."

Subsequently, when it is detected that an NM frame has not been transmitted in the bus 204 within a predetermined time, the determination unit 22 of the relay device 20 sets the bus 204 to be not a target for NM cooperation control in the control target management data 211 (Step S3).

Subsequently, the NM function units 11 of the information processing device 10-1A, the information processing device 10-1B, the information processing device 10-1C, . . . which are connected to the bus 201 determine whether sleeping of the corresponding device is enabled or disabled and transmit an ID of the corresponding device and an NM frame indicating that sleeping is enabled to the bus 201 (Step S4). Here, an NM frame in which the value of the Sleeping.ind bit 1002 is set to "1" and the value of the Sleeping.ack bit 1003 is set to "0" as illustrated in FIG. 1B is transmitted.

Subsequently, since the bus 202 and the bus 203 which are targets of NM cooperation control are sleeping-disabled, the control unit 23 of the relay device 20 transmits its own ID and an NM frame indicating that sleeping is disabled to the bus 201 (Step S5). Here, an NM frame in which the value of the Sleeping.ind bit 1002 is set to "0" and the value of the Sleeping.ack bit 1003 is set to "0" as illustrated in FIG. 1B is transmitted. Accordingly, the information processing device 10-1A, the information processing device 10-1B, the information processing device 10-1C, . . . which are connected to the bus 201 do not change to a sleeping state but is maintained in the normal state.

Subsequently, the NM function units 11 of the information processing device 10-2A, the information processing device 10-2B, the information processing device 10-2C, . . . which are connected to the bus 202 determine whether sleeping of the corresponding device is enabled or disabled and transmit an ID of the corresponding device and an NM frame indicating that sleeping is enabled to the bus 202 (Step S6).

Subsequently, since the bus 203 which is a target for NM cooperation control is sleeping-disabled, the control unit 23 of the relay device 20 transmits its own ID and an NM frame indicating that sleeping is disabled to the information processing devices 10 connected to the bus 202 (Step S7).

Subsequently, the NM function units 11 of the information processing device 10-3A, the information processing device 10-3B, the information processing device 10-3C, . . . which are connected to the bus 203 determine whether sleeping of the corresponding device is enabled or disabled and transmit an ID of the corresponding device and an NM frame indicating that sleeping is enabled to the bus 203 (Step S8).

Subsequently, since all the buses 201 to 203 which are targets of NM cooperation control is sleeping-enabled, the control unit 23 of the relay device 20 transmits its own ID and an NM frame indicating that sleeping is enabled to the buses 201 to 203 (Step S9).

Subsequently, the NM function units 11 of the information processing devices 10-1A to 10-3C and the like which are connected to the buses 201 to 203 and the NM function unit 24 of the relay device 20 change the corresponding devices to the sleeping state (Step S10), because all the devices having an NM function are sleeping-enabled among the other devices in the buses to which the corresponding devices are connected.

Subsequently, the control unit 12 of the information processing device 10-4A connected to the bus 204 transmits a frame or a dominant waveform to the bus 204 (Step S11).

Subsequently, since the bus 204 is set to be not a target for NM cooperation control, the control unit 23 of the relay device 20 does not transmit an NM frame of a wake-up request to the buses 201 to 203 and the information processing device 10-4A does not relay a frame or a dominant waveform to the buses 201 to 203 (Step S12). Accordingly, since wake-up of the whole system with a frame or a dominant waveform from the information processing device 10-4A not having an NM function as a trigger can be prevented, it is possible to reduce power consumption of a battery of a vehicle.

Subsequently, the control unit 12 of the information processing device 10-3A connected to the bus 203 transmits a frame or a dominant waveform to the bus 203 (Step S13).

Subsequently, since the bus 203 is a target for NM cooperation control, the control unit 23 of the relay device 20 transmits an NM frame of a wake-up request to other buses 201 and 202 which are targets of NM cooperation control (Step S14). Here, an NM frame in which the value of the Sleeping.ind bit 1002 is set to "1" and the value of the Sleeping.ack bit 1003 is set to "1" as illustrated in FIG. 1B is transmitted.

Subsequently, the NM function units 11 of the information processing devices 10-1A to 10-3C and the like which are connected to the buses 201 to 203 and the NM function unit 24 of the relay device 20 change the corresponding devices to the normal state (Step S15). When a frame has been received in Step S13, the relay device 20 may relay the received frame to a destination.

<<Processing Routine of Setting Target for NM Cooperation Control in Relay Device>>

A processing routine of setting whether each bus is a target for NM cooperation control which is performed by the relay device 20 according to the first embodiment will be described below with reference to FIG. 6. FIG. 6 is a flowchart illustrating an example of a processing routine of setting a target for NM cooperation control in the relay device 20 according to the embodiment. In the following description, one of the buses connected to the relay device 20 is referred to as a "bus to be processed." The buses connected to the relay device 20 are referred to as "buses to be processed" and the processing routine illustrated in FIG. 6 is performed for each bus.

In Step S101, the determination unit 22 determines whether a bus to be processed is a target for NM cooperation control with reference to the control target management data 211.

When the bus to be processed is a target for NM cooperation control (YES in Step S101), the determination unit 22 determines whether transmission of an NM frame in the bus to be processed has been detected within a predetermined time when the relay device 20 is in the normal state (Step S102).

When transmission of an NM frame has not been detected within the predetermined time (NO in Step S102), the determination unit 22 sets the bus to be processed to be not a target for NM cooperation control in the control target management data 211 (Step S103) and ends the processing routine.

When transmission of an NM frame in the bus to be processed has been detected within the predetermined time (YES in Step S102), the determination unit 22 ends the processing routine.

On the other hand, when the bus to be processed is not a target for NM cooperation control (NO in Step S101), the determination unit 22 determines whether an NM frame has been received in the bus to be processed (Step S104).

When an NM frame has been received (YES in Step S104), the determination unit 22 sets the bus to be processed to be a target for NM cooperation control in the control target management data 211 (Step S105) and ends the processing routine.

When an NM frame has not been received (NO in Step S104), the determination unit 22 ends the processing routine.

<<Processing Routine of NM Cooperation Control in Relay Device>>

Figure 7:
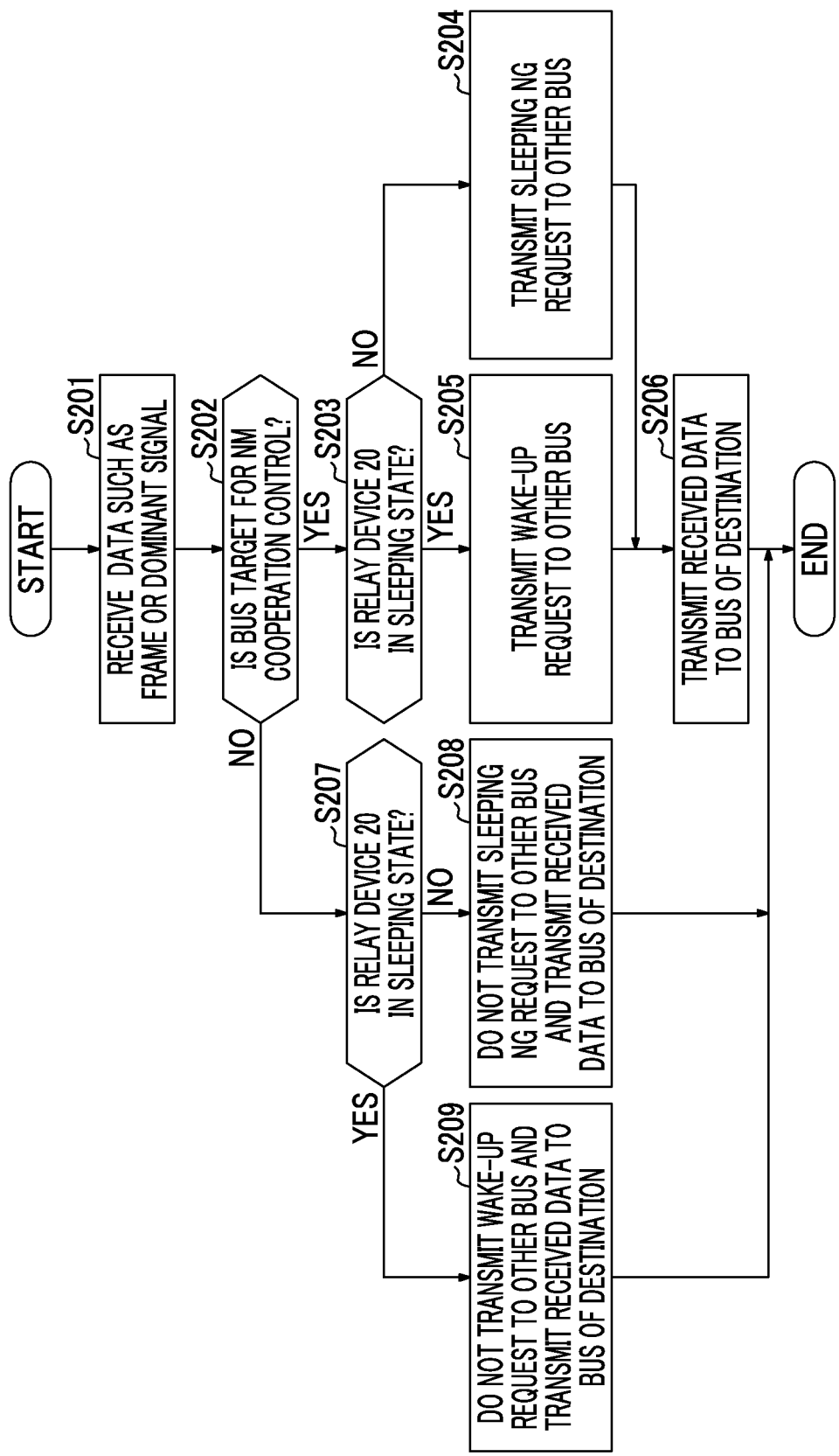
FIG. 7 is a flowchart illustrating an example of an NM cooperation control routine which is performed by a relay device according to a first embodiment.

A processing routine of NM cooperation control which is performed by the relay device 20 according to the first embodiment will be described below with reference to FIG. 7. FIG. 7 is a flowchart illustrating an example of a processing routine of NM cooperation control which is performed by the relay device 20 according to the first embodiment.

In Step S201, the control unit 23 receives data such as a frame or a dominant signal from an information processing device 10.

Subsequently, the control unit 23 determines whether the bus to which the information processing device 10 is connected is a target for NM cooperation control with reference to the control target management data 211 (Step S202).

When the bus to which the information processing device 10 is connected is a target for NM cooperation control (YES in Step S202), the control unit 23 determines whether the relay device 20 is in a sleeping state (Step S203).

When the relay device 20 is not in the sleeping state (NO in Step S203), the control unit 23 transmits a sleeping NG request to the buses other than the bus to which the information processing device 10 is connected among the buses which are targets of NM cooperation control with reference to the control target management data 211 (Step S204), and Step S206 which will be described below is performed. The information processing device 10 having received the sleeping NG request does not change to the sleeping state and is maintained in the normal state.

When the relay device 20 is in the sleeping state (YES in Step S203), the control unit 23 transmits a wake-up request to the buses other than the bus to which the information processing device 10 is connected among the buses which are targets of NM cooperation control with reference to the control target management data 211 (Step S205). The information processing device 10 having received the wake-up request returns from the sleeping state to the normal state.

Subsequently, the control unit 23 transmits (relays) the received data to the bus as a destination (Step S206) and ends the processing routine.

On the other hand, when the bus to which the information processing device 10 is connected is not a target for NM cooperation control (NO in Step S202), the control unit 23 determines whether the relay device 20 is in a sleeping state (Step S207).

When the relay device 20 is not in the sleeping state (NO in Step S207), the control unit 23 does not transmit a sleeping NG request to the buses other than the bus to which the information processing device 10 is connected, transmits (relays) the received data to the bus of a destination (Step S208), and ends the processing routine.

When the relay device 20 is in the sleeping state (YES in Step S207), the control unit 23 does not transmit a wake-up request to the buses other than the bus to which the information processing device 10 is connected, does not transmit (relay) the received data to the bus of a destination (Step S209), and ends the processing routine.

Second Embodiment

An example in which whether each network is a target for NM cooperation control is managed has been described in the first embodiment. In a second embodiment, an example in which whether each information processing device 10 is a target for NM cooperation control will be described. According to the second embodiment, even when an information processing device 10 having an NM function and an information processing device 10 not having an NM function are connected to a single network, it is possible to wake up the whole system with a frame or the like from the information processing device 10 having an NM function as a trigger, or the like.

The second embodiment is the same as the first embodiment except for a part and thus description thereof will be appropriately omitted. In the following description, the same elements as in the first embodiment will not be described and only different elements will be described.

<Processing Routine>

A processing routine of NM cooperation control which is performed by the relay device 20 according to the second embodiment will be described below with reference to FIG. 8. FIG. 8 is a flowchart illustrating an example of a processing routine of NM cooperation control which is performed by the relay device 20 according to the second embodiment.

In Step S301, the control unit 23 receives a frame, a dominant signal, or the like from an information processing device 10.

Subsequently, the control unit 23 determines whether the information processing device 10 has an NM function with reference to the control target management data 211 (Step S302).

When the information processing device 10 has an NM function (YES in Step S302), the control unit 23 determines whether the relay device 20 is in a sleeping state (Step S303).

The processes of Steps S303 to S306 are the same as the processes of Steps S203 to S206 in FIG. 7.

On the other hand, when the information processing device 10 does not have an NM function (NO in Step S302), the control unit 23 determines whether the relay device 20 is in a sleeping state (Step S307).

The processes of Steps S307 to S309 are the same as the processes of Steps S207 to S209 in FIG. 7.

<Modified Example>

In the above-mentioned embodiments, an example in which a CAN is used as a network subjected to relay of the relay device 20 has been described, but Ethernet (registered trademark) or the like may be used as a network subjected to relay of the relay device 20.

<Conclusion>

In a configuration in which a whole system is started by communication from an ECU not having an NM function or an ECU having a defective NM function, electric power of a battery of a vehicle is consumed even when a power supply switch for starting a vehicle or the like is turned off and an ACC power source or an IG power source is turned off.

According to the above-mentioned embodiments, when an information processing device 10 connected to a network has transmitted an NM frame or the like, the relay device 20 sets the network to be a target for NM cooperation control. Even when a dominant waveform, a frame, or the like is received from a network which is not a target for NM cooperation control, an NM frame for changing a network state is not transmitted to other networks. Accordingly, it is possible to reduce power consumption.

What is claimed is:

1. An onboard relay device that is configured to relay data which is transmitted and received between a first onboard device connected to a first network and a second onboard device connected to a second network, the onboard relay device comprising:
a processor and memory configured to:
receive a network management frame from the first onboard device indicating that the first onboard device is in a sleep-enabled state;
determine, based on the network management frame transmitted from the first onboard device, whether the first network is a target for cooperation control in which a network state is changed for the first network and the second network;
transmit a request associated with a change of the network state to the second network when first data has been received from the first onboard device and the first network is the target for the cooperation control; and
not transmit the request associated with the change of the network state to the second network, but determine whether the onboard relay device is in a sleeping state when the first data has been received and the first network is not the target for the cooperation control;
wherein the first onboard device is not the second onboard device.

2. The onboard relay device according to claim 1, wherein the network state includes a sleeping state and a normal state.

3. The onboard relay device according to claim 1, wherein the processor is configured, when the onboard relay device is in a sleeping state and the processor has received the first data,
to relay the first data to the second network in the case where the first network is the target for the cooperation control and
not to relay the first data to the second network in the case where the first network is not the target for the cooperation control.

4. The onboard relay device according to claim 1, wherein the request associated with the change of the network state is a request for prohibiting the second onboard device from changing to a sleeping state when the onboard relay device is in a normal state, and
the request associated with the change of the network state is a request for changing the second onboard device to the normal state when the onboard relay device is in the sleeping state.

5. The onboard relay device according to claim 1, wherein the network management frame indicating that the first onboard device is in a sleep-enabled state is defined by Offene Systeme und deren schnittstellen fur die Elektronik im Kraftfahrzeug, Offene Systeme und deren schnittstellen fur die Elektronik im Kraftfahrzeug-Vehicle Distributede Xecutive, or Automotive Open System Architecture.

6. An information processing method executable by a relay device that relays data which is transmitted and received between a first device connected to a first network and a second device connected to a second network, the information processing method comprising:
receiving a network management frame from the first onboard device indicating that the first onboard device is in a sleep-enabled state;
determining, based on the network management frame transmitted from the first device, whether the first network is a target for cooperation control in which a network state is changed for the first network and the second network; and
transmitting a request associated with a change of the network state to the second network when first data has been received from the first device and the first network is the target for the cooperation control, and
not transmitting the request associated with the change of the network state to the second network, but determining whether the onboard relay device is in a sleeping state when the first data has been received from the first device and the first network is not the target for the cooperation control;

wherein the first onboard device is not the second onboard device.

7. A non-transitory storage medium storing a program, the program being executable by a relay device that relays data which is transmitted and received between a first device connected to a first network and a second device connected to a second network, the program being configured to cause the relay device to perform an information processing method when the program is executed by the relay device, the method comprising:
receiving a network management frame from the first onboard device indicating that the first onboard device is in a sleep-enabled state;
determining, based on the network management frame transmitted from the first device whether the first network is a target for cooperation control in which a network state is changed for the first network and the second network; and
transmitting a request associated with a change of the network state to the second network when first data has been received from the first device and the first network is the target for the cooperation control, and
not transmitting the request associated with the change of the network state to the second network, but determining whether the onboard relay device is in a sleeping state when the first data has been received from the first device and the first network is not the target for the cooperation control;
wherein the first onboard device is not the second onboard device.

8. A relay device that relays data which is transmitted and received between a first device connected to a first network and a second device connected to a second network, the relay device comprising:
a processor and memory configured to:
receive a network management frame from the first onboard device indicating that the first onboard device is in a sleep-enabled state;
determine, based on the network management frame transmitted from the first device, whether the first network is a target for cooperation control in which a network state is changed for the first network and the second network;
transmit a request associated with a change of the network state to the second network when first data has been received from the first device and the first network is the target for the cooperation control; and
not transmit the request associated with the change of the network state to the second network, but determine whether the onboard relay device is in a sleeping state when the first data has been received from the first device and the first network is not the target for the cooperation control;
wherein the first onboard device is not the second onboard device.

9. An information processing system comprising:
a first device connected to a first network;
a second device connected to a second network; and
a relay device that relays data which is transmitted and received between the first device and the second device, wherein the relay device includes:
a processor and memory configured to:
receive a network management frame from the first onboard device indicating that the first onboard device is in a sleep-enabled state;
determine, based on the network management transmitted from the first device, whether the first network is a target for cooperation control in which a network state is changed for the first network and the second network,
transmit a request associated with a change of the network state to the second network when first data has been received from the first device and the first network is the target for the cooperation control, and
not transmit the request associated with the change of the network state to the second network, but determine whether the onboard relay device is in a sleeping state when the first data has been received from the first device and the first network is not the target for the cooperation control, and
wherein the second device is configured to change to a normal state or not to change to a sleeping state when the second device has received a request for prohibiting change to the sleeping state from the relay device after having transmitted data indicating that the second device is enabled to change to the sleeping state;
wherein the first onboard device is not the second onboard device.

* * * * *